(12) United States Patent
Jerding et al.

(10) Patent No.: US 6,817,028 B1
(45) Date of Patent: Nov. 9, 2004

(54) REDUCED SCREEN CONTROL SYSTEM FOR INTERACTIVE PROGRAM GUIDE

(75) Inventors: Dean F. Jerding, Roswell, GA (US); Robert O. Banker, Cumming, GA (US); Arturo A. Rodriguez, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 529 days.

(21) Appl. No.: 09/590,925

(22) Filed: Jun. 9, 2000

Related U.S. Application Data

(60) Provisional application No. 60/138,757, filed on Jun. 11, 1999.

(51) Int. Cl.[7] .......................... G06F 3/00; G06F 13/00; H04N 5/445
(52) U.S. Cl. .......................... 725/52; 725/43
(58) Field of Search .............................. 725/43, 47, 54, 725/57, 41, 42, 46, 52; 345/802; 348/563, 569, 565

(56) References Cited

U.S. PATENT DOCUMENTS

| | | |
|---|---|---|
| 4,706,121 A | 11/1987 | Young |
| 4,751,578 A | 6/1988 | Reiter et al. |
| 4,885,775 A | 12/1989 | Lucas |
| 4,908,713 A | 3/1990 | Levine |
| 4,963,994 A | 10/1990 | Levine |
| 4,991,011 A | 2/1991 | Johnson et al. |
| 5,038,211 A | 8/1991 | Hallenbeck |
| 5,253,066 A | 10/1993 | Vogel |
| 5,293,357 A | 3/1994 | Hallenbeck |
| 5,477,262 A | 12/1995 | Banker et al. |
| 5,479,268 A | 12/1995 | Young et al. |
| 5,508,815 A | 4/1996 | Levine |
| 5,568,272 A | 10/1996 | Levine |
| 5,621,456 A * | 4/1997 | Florin et al. ................... 725/43 |
| 5,809,204 A | 9/1998 | Young et al. |
| 5,850,218 A * | 12/1998 | LaJoie et al. ................. 725/45 |
| 5,907,323 A | 5/1999 | Lawler et al. |
| 5,915,068 A | 6/1999 | Levine |
| 6,081,263 A * | 6/2000 | LeGall et al. ............... 345/760 |
| 6,243,142 B1 | 6/2001 | Mugura et al. ............. 348/564 |
| 6,397,386 B1 * | 5/2002 | O'Connor et al. ............ 725/39 |
| 6,442,755 B1 * | 8/2002 | Lemmons et al. ............ 725/47 |
| 6,481,011 B1 * | 11/2002 | Lemmons ..................... 725/47 |
| 6,530,083 B1 * | 3/2003 | Liebenow ..................... 725/46 |
| 6,563,515 B1 * | 5/2003 | Reynolds et al. ........... 345/721 |
| 6,564,378 B1 * | 5/2003 | Satterfield et al. ............ 725/40 |

FOREIGN PATENT DOCUMENTS

| | | |
|---|---|---|
| WO | WO 96/41478 | 12/1996 |
| WO | WO 98/56172 | 12/1998 |

* cited by examiner

*Primary Examiner*—John Miller
*Assistant Examiner*—Scott Beliveau

(57) ABSTRACT

An apparatus and method for browsing and viewing television programs while viewing a television program guide. In other words, a user is able to remain inside the program guide while viewing various television programs. In another aspect, a server system operator is provided an interface with flexible options for configuring user controls for viewing television programs while inside program guides in client devices.

8 Claims, 10 Drawing Sheets

REDUCED SCREEN CONTROL MENU

IPG FOCUS AND SELECTION EFFECTS ON REDUCED SCREEN:
☐ REDUCED SCREEN TUNING UNRELATED TO IN-FOCUS CHANNEL
☐ IN-FOCUS CHANNEL DETERMINES REDUCED SCREEN
☐ SELECTED IN-FOCUS CHANNEL DETERMINES REDUCED SCREEN

NON-NUMERIC CHANNEL SIGNALS:
☐ EXIT IPG AND TUNE TO REQUESTED CHANNEL
☐ TUNE REDUCED SCREEN TO REQUESTED CHANNEL
☐ CHANGE IN-FOCUS CHANNEL TO REQUESTED CHANNEL

NUMERIC CHANNEL SIGNALS:
☐ EXIT IPG AND TUNE TO REQUESTED CHANNEL
☐ TUNE REDUCED SCREEN TO REQUESTED CHANNEL
☐ CHANGE IN-FOCUS CHANNEL TO REQUESTED CHANNEL

REDUCED SCREEN CONTROL MENU

IPG FOCUS AND SELECTION EFFECTS ON REDUCED SCREEN:

- ☐ REDUCED SCREEN TUNING UNRELATED TO IN-FOCUS CHANNEL
- ☐ IN-FOCUS CHANNEL DETERMINES REDUCED SCREEN
- ☐ SELECTED IN-FOCUS CHANNEL DETERMINES REDUCED SCREEN

NON-NUMERIC CHANNEL SIGNALS:

- ☐ EXIT IPG AND TUNE TO REQUESTED CHANNEL
- ☐ TUNE REDUCED SCREEN TO REQUESTED CHANNEL
- ☐ CHANGE IN-FOCUS CHANNEL TO REQUESTED CHANNEL

NUMERIC CHANNEL SIGNALS:

- ☐ EXIT IPG AND TUNE TO REQUESTED CHANNEL
- ☐ TUNE REDUCED SCREEN TO REQUESTED CHANNEL
- ☐ CHANGE IN-FOCUS CHANNEL TO REQUESTED CHANNEL

REDUCED SCREEN CONTROL SYSTEM FOR INTERACTIVE PROGRAM GUIDE

CROSS-REFERENCE TO RELATED APPLICATION

This application claims the benefit of U.S. Provisional Application No. 60/138,757, filed Jun. 11, 1999, which is also hereby incorporated by reference herein in its entirety.

FIELD OF THE INVENTION

This invention relates in general to television systems, and more particularly, to the field of interactive program guides.

BACKGROUND OF THE INVENTION

Historically, television services have been comprised of analog broadcast audio and video signals. Cable television systems now receive broadcasts and retransmit them with other programming to subscribers over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communication terminal ("HCT"), otherwise known as the set-top box, has become an important computing device for accessing video services and navigating a subscriber through a maze of services available. In addition to supporting traditional analog broadcast video and functionality, digital HCTs (or "DHCTs") now also support an increasing number of services which are not analog, but rather digital; are not basic broadcast, but rather two-way communication such as video-on-demand; and are not basic video, such as e-mail or web browsers. These are all in addition to the host of other television services which are increasingly being demanded by consumers, examples of which include audio and audio/visual programming, advance navigation controls, impulse pay-per-view technology, and on-line commerce. In addition to the interactive services, the increased bandwidth available through a digital television system has made it possible for a subscriber to have access to hundreds, or even thousands, of channels and/or services. Thus, in order to provide these more powerful and complex features, the simple conventional channel abstractions need to be extended beyond those which have traditionally been provided.

Each HCT and DHCT (collectively hereinafter "DHCT") are typically connected to a cable or satellite television network. The DHCTs generally include hardware and software necessary to provide the functionality of the digital television system at the client's site. Preferably, some of the software executed by a DHCT is downloaded and/or updated via the cable television network. Each DHCT typically includes a processor, a communication component and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

As more and more services and applications are provided, cable television systems are providing television program information to the DHCT so that the subscriber can view the program information on the DHCT display such as the television. This program information has traditionally been organized for presentation purposes into a program guide format that presents the program information by time and channel only. The program guide can, for instance, automatically scroll the available television channels to present the program information such as name and title, by time.

Many cable system operators include one or more dedicated channels that scroll through the channel list displaying the programs that not only are currently on, but also are scheduled to be on in the future. These types of passive displays do not rely on a terminal for presentation of the programming data and also lack the interactive functionality of permitting a subscriber to scroll to a desired channel for a desired time. For example, the subscriber typically must view the programming information as it scrolls on the display and wait for either the desired channel and/or the desired time to search for the program that may be available for viewing.

With the advent of program guide "browsers" for use in cable television systems, viewers (also referred to as "subscribers" or "users") can literally scan program information by time and channel while watching the tuned channel. In analog systems that offer a limited number of cable television channels, these browsers enable the viewer to easily scan available programs one-by-one in order of channel number. However, many digital systems can provide hundreds or even thousands of channels. In such systems, viewers may be only familiar with a small fraction of the television programs available for viewing. As a result, viewers may end up spending significant amounts of time browsing through on-screen program guides in order to determine which program they would enjoy watching the most. This may be inconvenient since either the viewer browsing the program guide or other viewers in the same room may be missing a desirable alternative program while the program guide is being browsed. In addition, program descriptions in on-screen program guides often do not provide a viewer with enough information to be able to determine whether he or she would enjoy watching a particular program.

SUMMARY OF THE INVENTION

Briefly described, one preferred embodiment of the present invention provides an apparatus and method for browsing and viewing different television programs while browsing a television program guide. In other words, a user is able to remain inside the program guide while viewing various television programs. In another aspect of a preferred embodiment of the present invention, a server system operator is provided an interface with flexible options for configuring user controls for viewing television programs while inside program guides in client devices.

Other objects, features, and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts or screen areas throughout the several views.

FIG. 4 is a diagram of a control menu for a system operator at the headend to configure how the reduced screen area of an interactive program guide will be tuned by a client device in accordance with the present invention as depicted in FIG. 2.

DETAILED DESCRIPTION OF THE PREFERRED EMBODIMENTS

Figure 1:
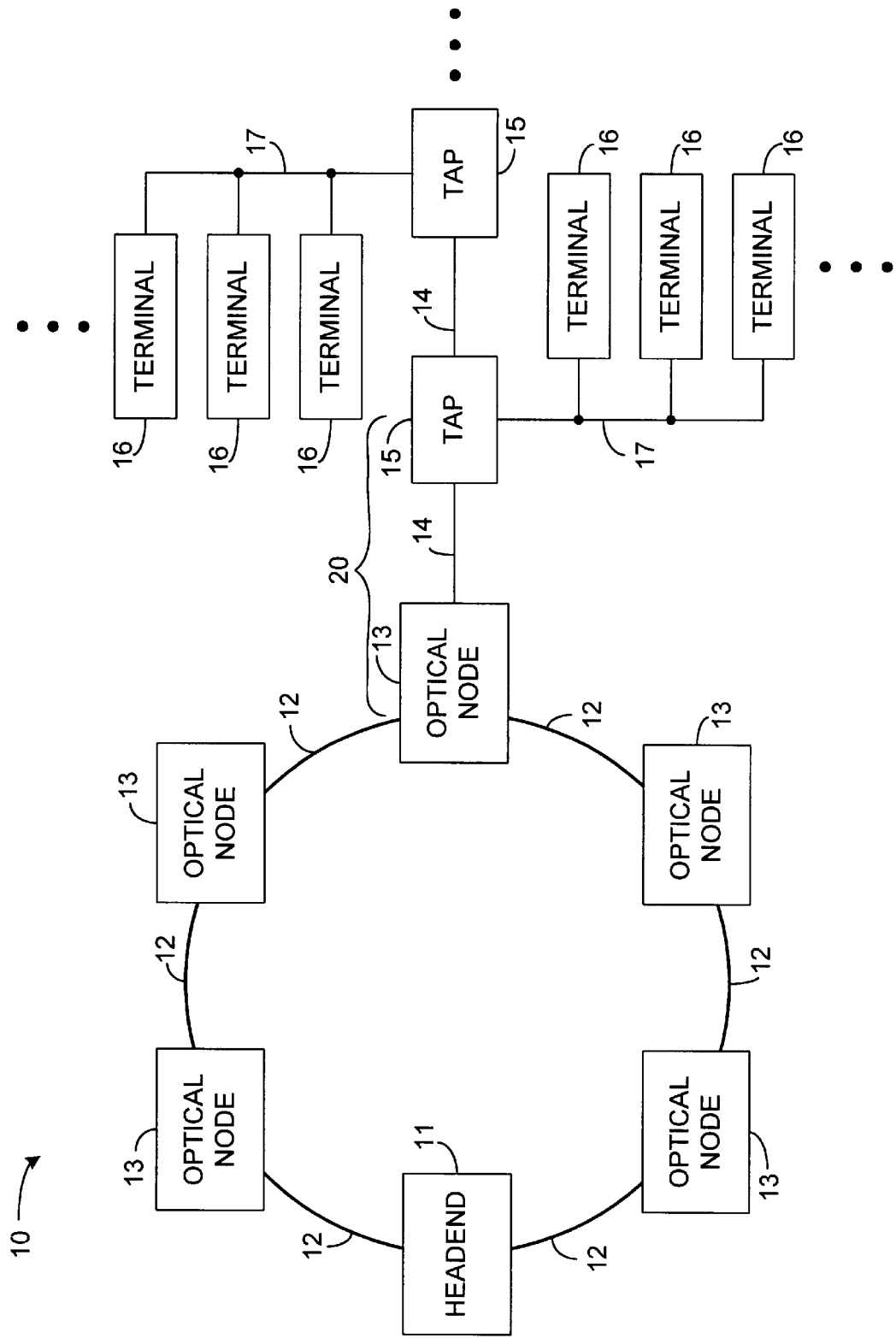
FIG. 1 is a block diagram of a cable television system in accordance with one preferred embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. Thus, headend 11 is connected through a network 20 to multiple DHCTs 16.

Figure 2:
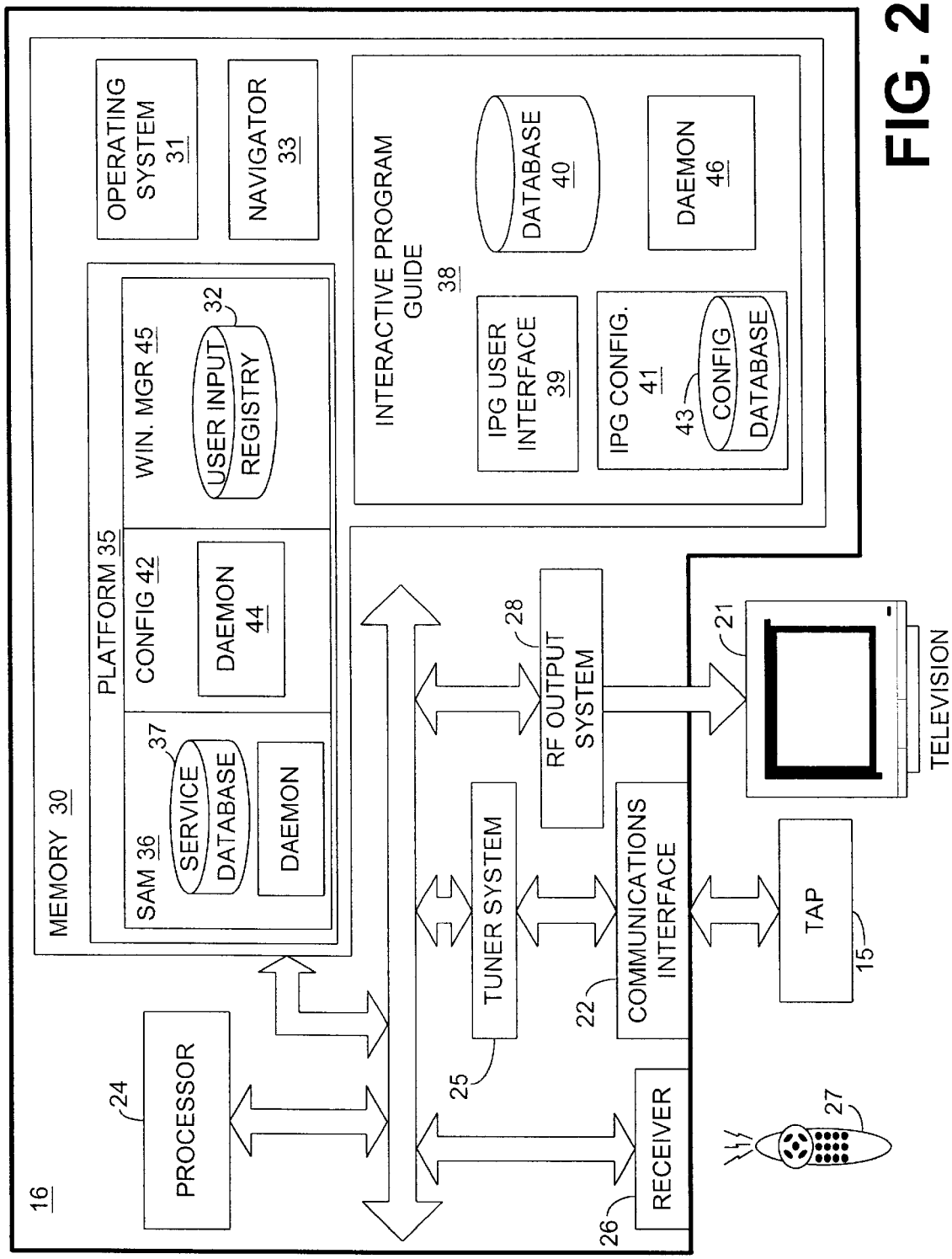
FIG. 2 is a block diagram of a DHCT and related equipment, in accordance with one preferred embodiment of the present invention depicted in FIG. 1.
Figure 10:
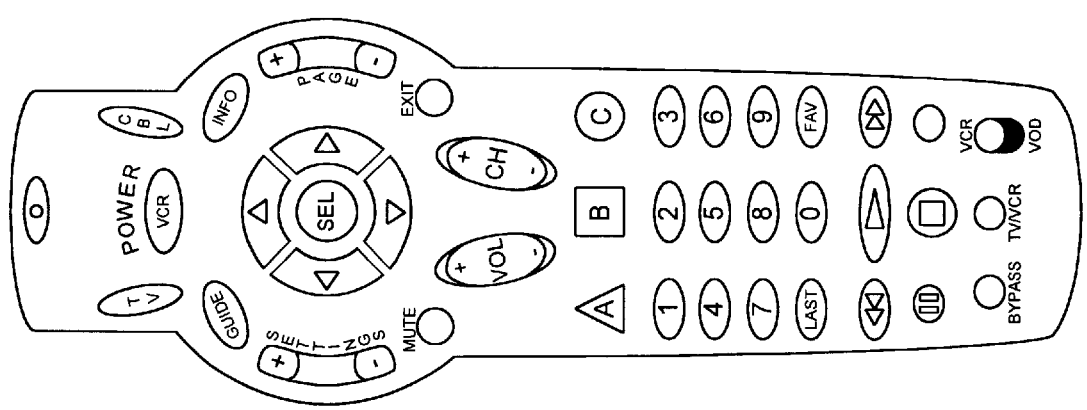
FIG. 10 is a block diagram of an example of a remote control device for use with the DHCT depicted in FIG. 2.

FIG. 2 is a block diagram illustrating the DHCT 16 and other system equipment. The DHCT 16 is typically situated within the residence or business of a subscriber. It may be integrated into a device that has a display 21, such as a television set, or it may be a stand-alone unit that couples to an external display 21, such as a display included in a computer or a television, and that processes television signals for presentation to a subscriber. The terminal 16 preferably comprises a communications interface 22 for receiving the RF signals, which can include video, audio and data information, from the tap 15 and for providing any reverse information to the tap 15 for transmission back to the headend 11 (FIG. 1). The DHCT 16 further includes a processor 24 for controlling operations of the DHCT 16, a video output port such as an RF output system 28 for driving the display 21, and a tuner system 25 for tuning into a particular television channel to be displayed and for sending and receiving various types of data from the headend 11. The tuner system includes in one implementation, an out-of-band tuner for bi-directional quadrature phase shift keying (QPSK) data communication and a quadrature amplitude modulation (QAM) tuner for receiving television signals. Additionally, DHCT 16 includes a receiver 26 for receiving externally-generated information, such as subscriber inputs or commands from other devices. The DHCT 16 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), and serial, and/or parallel ports. The subscriber inputs may, for example, be provided by a computer or transmitter with buttons or keys located on the exterior of the terminal, by a hand-held remote control device 27 (an example of which is shown in FIG. 10), or by a keyboard that includes subscriber-actuated buttons. With brief reference to FIG. 10, among other keys, examples of keys on the remote control device 27 include, without limitation, numeric channel indication keys, or buttons, e.g., keys labeled "0"–"9", non-numeric channel indication keys (channel increment (CH+), channel decrement (CH−), favorite channel (FAV), last channel (LAST)), and directional keys with arrows (UP, DOWN, LEFT, RIGHT), a SELECT (SEL) key, and a GUIDE key.

Memory 30, such as a non-volatile and dynamic random access memory, is coupled to the processor 24 and stores operational parameters, such as commands that are recognized by the processor 24. The most basic functionality of the DHCT 16 is provided by an operating system 31 that operates in memory 30. One or more programmed software applications, herein referred to as applications, are executed by utilizing the computing resources in the DHCT 16. The executable application program stored in memory 30 is executed by processor 24 (e.g., a central processing unit or digital signal processor) under the auspices of the operating system 31. Data required as input by the application program is stored in memory 30 and read by processor 24 from memory 30 as need be during the course of application program execution. Input data may be data stored in memory 30 by a secondary application or other source, either internal or external to the DHCT 16, or may have been created with the application program at the time it was generated as a software application program. Data may be received via any of the communication ports of the DHCT 16, from the headend 11 via the DHCT's network interface (i.e., the QAM or out-of-band tuners) or as subscriber input via receiver 26. A type of input data fulfills and serves the purpose of parameters as described below. Data generated by application program is stored in memory 30 by processor 24 during the course of application program execution. Availability, location and amount of data generated by a first application for consumption by a secondary application is communicated by messages as described below. Messages are communicated through the services of the operating system 31, such as interrupt or polling mechanisms or through data sharing mechanisms such as semaphores.

A Navigator (application) 33 is responsible for providing the subscriber the capability to select services and also provides a core functionality of the DHCT 16, including volume and settings. To implement its functionality, the Navigator 33 communicates with a platform 35, which is a collection of functionality such as the services application manager (SAM) 36, a Configuration Manager 42, and a Window Manager 45 that is useful to the applications. The platform 35 may also include such functionality as a Timer Manager, a Compression Manager, an HTML Parser, a Database Manager, A Widget Toolkit, and other utilities (not shown).

In one implementation, the Window Manager 45 maintains, among other things, a user input registry 32 so that when a subscriber enters a key or a command via the remote device 27 or another input device such as a keyboard or mouse, the user input registry 32 is accessed to determine which of various applications running on the DHCT 16 should receive the inputted key and it what order. The Navigator 33 registers for certain user input commands with the Window Manager 45 so that when the subscriber hits a key corresponding to one of the commands on the remote 27, the command is received by the receiver 26 and relayed to the processor 24. The processor 24 dispatches the event to the operating system 31 where it is forwarded to the Window Manager 45, which ultimately accesses the user input registry 32 and routes the incoming command to the Navigator 33. The Navigator 33 registers for user input commands that correspond to service navigation functions such as selecting a channel (channel increment, channel decrement, favorite, last) and those for other reserved functionality such as a key to activate the program guide, e.g., a GUIDE key.

After the Navigator 33 is activated by the remote 27, it sends a command to a services application manager ("SAM") component 36 part of the platform 35. The SAM 36 maintains a services database 37 of all services available on the DHCT 16 that the subscriber may access. A service is a pairing of an application and a parameter, such as a WatchTV application (not shown) and the television program to tune (e.g. NBC), or an Email application (not shown) and the IP address of the Email server. When the SAM 36 receives a query from the Navigator 33, it accesses the service database 37 and informs the Navigator 33 about the existence and status of the requested service. The Navigator 33 can further query the SAM 36 to determine if the service is authorized for the DHCT 16 and, if so, subsequently command the SAM to activate the service. In response, the SAM 36 initiates an activate service message to the application identified in the service database as the provider of the desired service. As a non-limiting example, the subscriber pressing a "GUIDE" key on the remote 27 would activate the interactive program guide (application) 38. That is, the subscriber presses a first key that invokes display of an interactive program guide (IPG) 38 presentation session.

The IPG 38 displays a program guide to the subscriber and populates the guide with program data for selection. Contained in the IPG 38 is a user interface component 39 that controls the screen display presented to the subscriber on display 21. When the user interface 39 receives the activation message from the SAM 36, the user interface 39 proceeds in accessing an IPG database 40 and a configuration module 41 to determine the appropriate program guide configuration (initial guide arrangement or view) to present to the subscriber on the display 21. The IPG database 40 contains program data files of current and future television programs. An IPG configuration module 41 stores settings that the user interface 39 will implement in creating the display for the subscriber. According to the preferred embodiment of the present invention, the IPG configuration module 41 includes a configuration database 43 of all configurations relevant to the IPG 38. The configuration manager 42 allows applications to access configurations stored in other applications, such as the IPG configuration database 43. Some of these configurations are pre-loaded into DHCT 16 non-volatile memory before it is released to a subscriber for use in viewing television services. Additionally, configurations can be updated, added, or replaced in the DHCT 16 by communicating the configuration data files 54 (FIG. 3) from the headend 11 to Configuration Daemon 44 which writes the configuration data files 54 to the various application configuration databases, such as the IPG configuration database 43. Although the IPG configuration database 43 provides a variety of initial configurations that the IPG user interface 39 may implement, one of these is denoted as the selected configuration that is ultimately implemented by the user interface 39. The configuration daemon 44 on the platform 35 will update the application configuration databases, such as IPG configuration database 43, whenever the DHCT 16 is powered up or when the configuration daemon 44 receives an update message from the headend 11 with new settings for the configurations.

When the IPG user interface 39 receives the activate service command from the SAM 36 responsive to a user selecting the IPG from the remote 27, the IPG user interface 39 accesses the IPG configuration module 41 to determine which viewing arrangement to present to the subscriber on the display 21. Based on the configuration information stored in the configuration module 41, the user interface 39 utilizes the window manager 45 and other graphics utilities provided by the operating system 31 to draw the screen on the display 21. The window manager 45 is a component that in one embodiment is part of the platform 35, but in other embodiments may be part of the operating system 31. In addition to the user input registry mentioned previously, it contains functionality for managing screen real-estate and synchronizing the drawing done by multiple applications. The operating system 31 provides primitives to the user interface 39 to, for example, to create a rectangular region on display 21 and to draw into that rectangle graphics utilities such as lines, shadings and strings.

As a window is created on display 21 for presentation to the subscriber, the IPG user-interface 39 registers with the window manager 45 for particular user input commands that are required by the newly-created window on the display 21. The IPG 38 also contains a daemon 46 that receives program data files 53 from the headend 11, and the daemon 46 stores the program data files 53 in the database 40 for utilization by the user interface 39.

The Navigator application 33, IPG 38, and all other applications executed by the resources of the DHCT 16 comprise an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example, but is not limited to, an electronic, solid-state, magnetic, optical, electromagnetic, infrared, or semiconductor system, apparatus, device, or propagation medium, either internal to the DHCT 16 or externally connected to the DHCT 16 via one or more communication ports or network interfaces. More specific examples (a nonexhaustive list) of the computer-readable medium would include the following: an electrical connection (electronic) having one or more wires, a portable computer diskette (magnetic), a hard drive storage device (magnetic) a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Furthermore, any process descriptions or blocks in flow charts should be understood as representing modules, segments, or portions of code or programmed software which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 3:
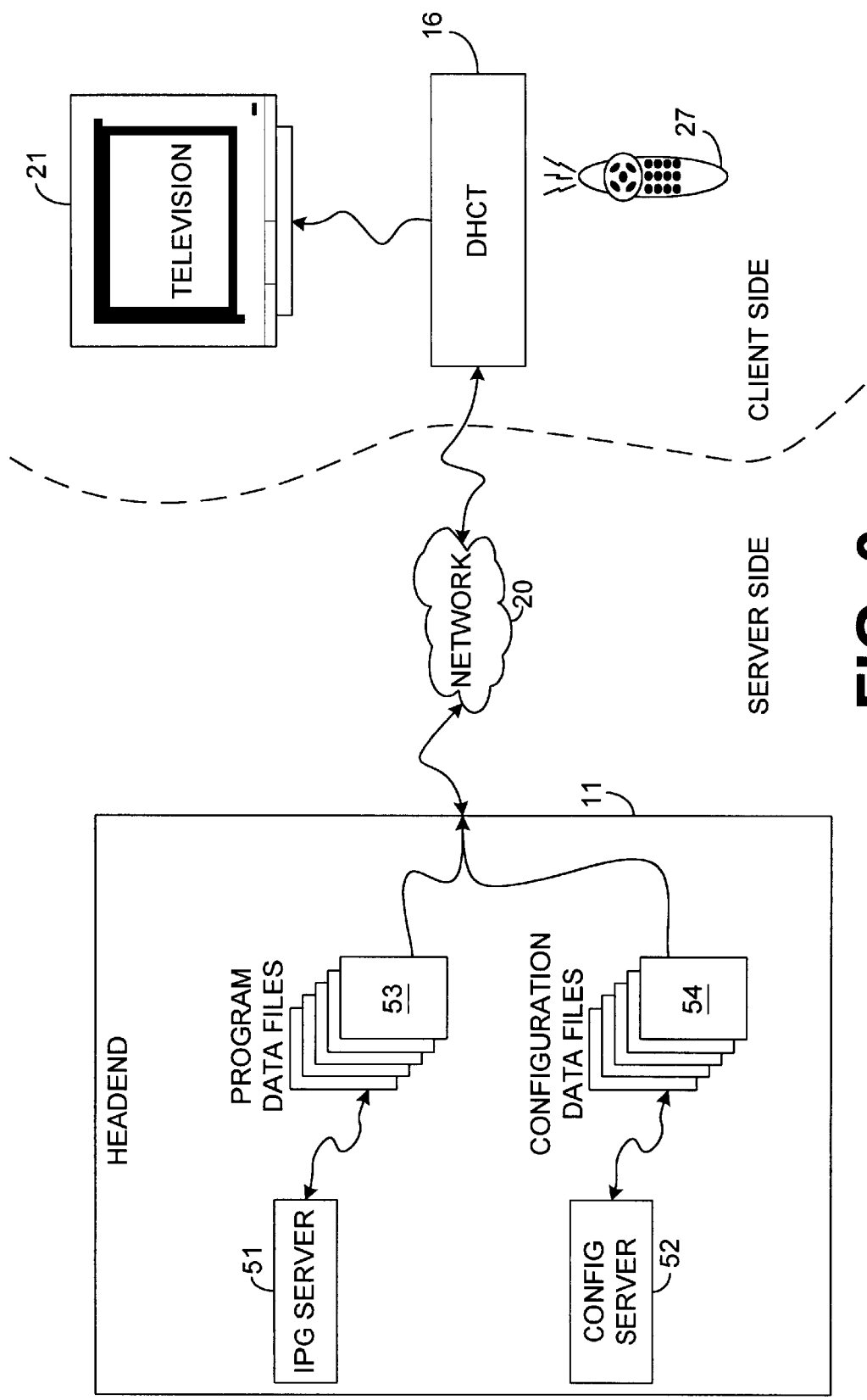
FIG. 3 is a diagram depicting files that are transferred from the headend of the cable television system across to the DHCT depicted in FIG. 2.

FIG. 3 is a diagram of selected components resident on the headend 11 and their interaction with the DHCT 16 on the client side of the network 20. An IPG server 51 is contained on the headend 11 and assembles program data files 53 for transmission across the network 20 to the IPG daemon 46 (FIG. 2) in the DHCT 16. The program data files 53 are the data files that contain information about current and of future programs, including their prospective viewing times, descriptive information, channels etc. The IPG server 51 allows the system operator to configure how many days in advance for which the program data files 53 will contain programming information. A configuration server 52 maintains and transmits across network 20 configuration data files 54 that comprise a plurality of program guide arrangement definitions, as well as indication of a selected initial program guide arrangement for the display 21.

With reference to FIG. 2, the configuration daemon 44 receives the configuration information and stores it in the IPG configuration database 43 from which configuration module 41 accesses the information, as discusses above. The program data files 53 (FIG. 3) created by the IPG server 51 on the headend 11 are received by the IPG Daemon 46 which populates the IPG database 40 in memory 30 with the program data files 53 for utilization by the user interface 39 when commanded by the subscriber. Alternatively, the IPG database 40, or parts thereof may be stored in a storage device that is internal to the DHCT 16 or externally connected to the DHCT 16 via a communication port such as USB or IEEE-1394.

In FIG. 2 and FIG. 3, functionality of the various layers of software, including the operating system 31, platform 35, and applications such as the IPG 38 and Navigator 33 are generally present on both the client side and the server side of the cable television system. The Navigator 33 assists in providing basic cable services and navigation framework to the subscriber. The services available can include watching television and pay-per-view events, listening to digital music, and viewing the interactive program guide 38 (FIG. 2). The Navigator 33 also allows subscribers to access the settings in the DHCT 16 (FIG. 2), including volume, parental control, VCR commands, etc. The operating system 31 is a resident operating system on the DHCT 16 and is provisioned for reception of multi-media data over the broadcast and interactive cable networks and uses an open and modular platform to allow flexibility and customization. As a result, some features of the operating system 31 include real time multi-media data reception, streaming and processing, as well as multi-tasking capability, and an open platform. The operating system 31 also provisions the communication of data among different entities such as a multiplicity of applications executing in the DHCT 16. The application interface system (AIS) or Platform 35 is a collection of end-to-end software interfaces enabling applications on the cable televisions system network 10. The SAM 36 provides an interface and mechanism through which applications can be developed, introduced on the network, defined as a service, downloaded to the DHCT 16, executed on the DHCT 16 and removed from the network. The AIS is an end layer of application and service management software components that an application must utilize to exist in the cable television system network 10. It also consists of resource access and management components generally required by applications in the cable television system network 10. None of the AIS components have any client-side subscriber-interface, although graphical subscriber interfaces can exist to access server-side components.

FIG. 4 is a diagram of a control menu 64 for a system operator at the headend 11 to configure how a reduced screen display area of the IPG user interface 39 will be controlled, in accordance with the present invention as depicted in FIG. 2. In one implementation, a system operator can use the menu to select the desired settings for the reduced screen display area. These settings will determine how the reduced screen display area will be tuned in relation to the television program information that will be presented to a subscriber and in relation to input received by the DHCT 16 (FIG. 2) from a subscriber. These selections are communicated across the system network 20 to each individual DHCT 16. The settings and factors that determine which channel a reduced screen display area is tuned to are discussed in more detail below. Of course, many other arrangements and expressions of the options shown in FIG. 4 are considered to be within the scope of the present invention. In addition, an alternative embodiment of the present invention permits the subscriber to determine how the reduced screen display area will be tuned in relation to the television program information that is to be presented to a subscriber and in relation to subsequent subscriber input.

Regarding the implementation shown in FIG. 4, as discussed in more detail below, settings are first included for determining whether and how "in-focus" (highlighted) or "selected" (responsive to a SELECT key being pressed) program titles in the interactive program guide affect the reduced screen. A user typically moves a highlighted cursor around the interactive program guide using the arrow keys (UP, DOWN, RIGHT, LEFT) on the remote control 27, thus changing the "in-focus" program. In addition, the interactive program guide can be configured to use numeric and/or non-numeric channel keys to exit the interactive program guide and turn to the requested channel, tune the reduce screen to the requested channel, or make the requested channel the "in-focus" channel within the interactive program guide (which would then cause such keys to defer to the setting of the above selection regarding the effect of the "in-focus" indication).

Figure 5:
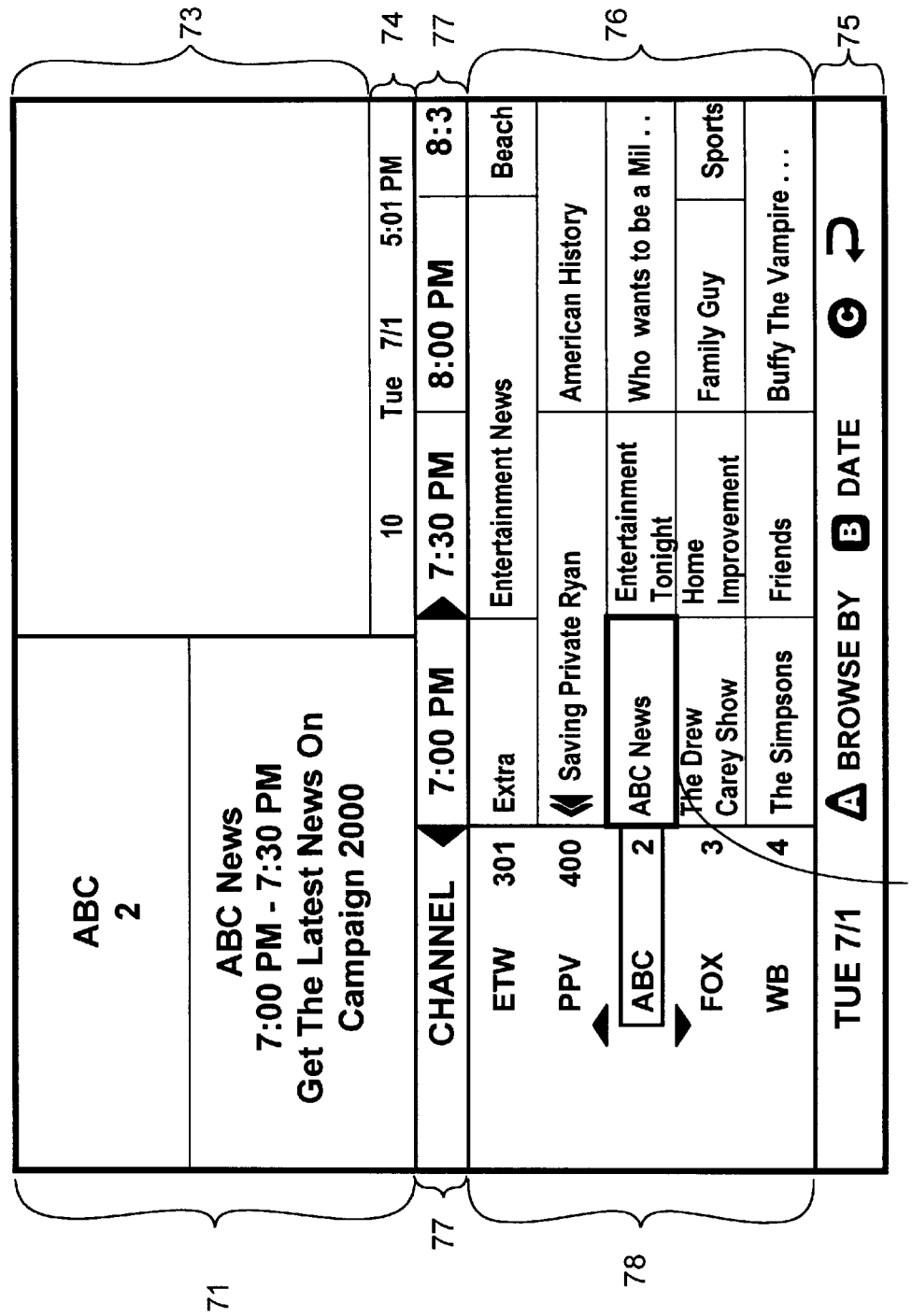
FIG. 5 is an example screen diagram that illustrates an initial guide arrangement in a time format that the DHCT as depicted in FIG. 2 presents the subscriber.

FIG. 5 is an example screen diagram of the IPG display 70 that illustrates an initial guide arrangement in a time format that the DHCT 16 as depicted in FIG. 2 presents the user. The top left portion of the main IPG display 70 is a detailed focus area 71 that includes detailed channel information (channel number, channel name (TWC), program name, program description, duration, any episode information or rating, etc.) for an "in-focus" program corresponding to highlighted program area 72 in a main program display area 76. Video showing on the channel to which the DHCT 16 is currently tuned (for which audio is also playing, and which is typically the program occupying the full screen before the IPG 38 is activated) is displayed in a roughly one-quarter screen reduced screen display area 73 in the IPG display 70. Immediately below the reduced screen display area 73 is an information banner 74 depicting the channel to which the DHCT 16 is currently tuned, the current day and date, and the current time. The middle left portion of the IPG display 70 includes a channel area 78 that is related to the selected ordering format and is described in more detail below. The middle portion of the IPG display 70 includes a heading area 77 that contains headings related to the information displayed in the channel area 78 and the main program display area 76. The main program display area 76 contains television program titles corresponding to television programs that are or will be available for viewing during the time periods listed the heading area 77. The highlighted program area 72 is centered in the main program display area 76 enabling the subscriber to scroll up and down to the various program titles listed in the main program display area 76.

The main program display area 76 includes program names, or titles, organized in a grid of rows of channels and columns of time. The channel area 78 includes a vertical list of channels organized sequentially from top to bottom by increasing channel number. The main program display area 76 can be scrolled with the arrow keys on the remote control 27 in both time and channel number dimensions. The time dimensions are a horizontal array of program names categorized in columns of times in which they are broadcast. As the subscriber scrolls in time across a calendar day boundary, the selected day displayed in various areas is automatically updated.

When the IPG 38 (FIG. 2) is first activated by the subscriber and the time view is configured to be the initial view, the first, or lowest, channel, including channel name and number, in the channel lineup is centered in the channel area 78 of the IPG display 70. In this non-limiting example, the lowest channel in this channel list displayed in the channel area 78 is ABC, which is shown as channel 2. Continuing with this non-limiting example, the left-most time column in the main program display area 76 is set to include titles of programs scheduled to be broadcast about two hours into the future with the middle title being "in-focus" and corresponding to a program on the lowest available channel. Therefore, in this example, the program ABC news which is on channel 2, is centered in the highlighted program area 72. It should be noted that the current program shown in reduced screen display area 73 and referenced in information banner 74, corresponds to channel 10 and not to the in-focus program on channel 2. The bottom area 75 of IPG display 70 indicates the selected day for which program data is being displayed as well as the options for the "A", "B", and "C" keys on the remote 27 (FIG. 2). The "A" key is assigned to invoke a "Browse-by" menu which would enable subscribers to select alternative program guide arrangement views such as, for example, program guides containing television program information arranged on the basis of title or theme. The "B" key enables the subscriber to select an alternative date for which television program information is presented. Operation of the "C" key results in the program currently showing on the channel to which the DHCT is tuned becoming the "in-focus" program; thus, the displaying of television program titles in the main program display area 76 which correspond to television programs that are or will be playing during an aggregate time period that includes the current time. The time periods listed in the heading area 77 are updated accordingly so that the time period listed above the left most column of the main display area 76 includes the current time.

Figure 6:
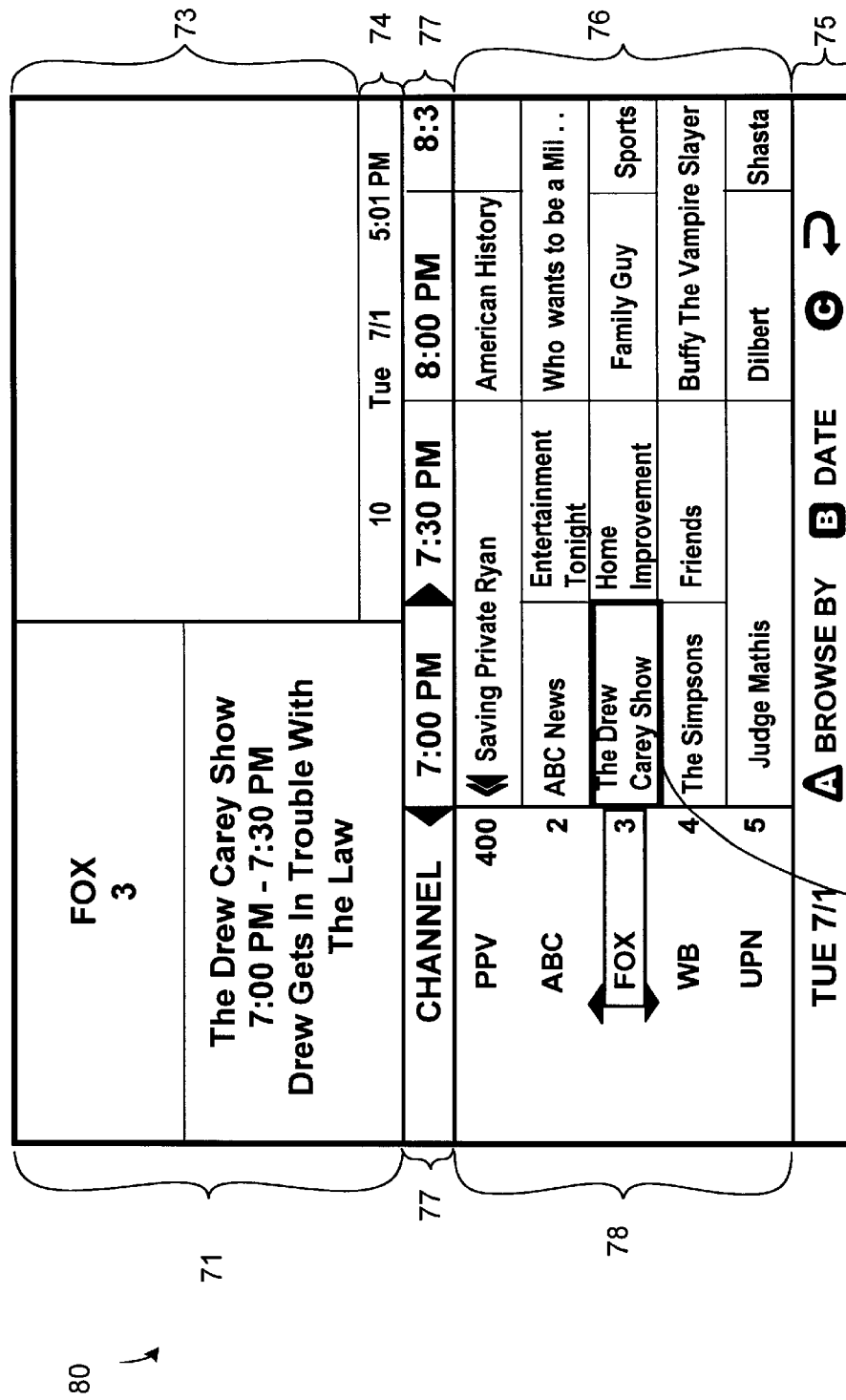
FIG. 6 is an example screen diagram that illustrates how the tuning of the reduced screen display area does not follow the in-focus television program as the screen transitions from that shown in FIG. 5.

FIG. 6 is an example screen diagram of the IPG display 80 that illustrates how the tuning of the reduced screen display area 73 operates when the "REDUCED SCREEN TUNING UNRELATED TO IN-FOCUS CHANNEL" option in FIG. 4 is selected by a system operator at the headend. Under this scenario, by pressing a down arrow on the remote 27 (FIG. 2), a subscriber can cause the DHCT 16 to scroll through the IPG display 70 (FIG. 5) so that, in effect, the IPG display 80 as shown in FIG. 6 is displayed. Therefore, in this example, the program The Drew Carey Show, which is on channel 3, is centered in the highlighted program area 72. Notice that the channel number in information banner 74 still indicates channel number 10. This indicates that the reduced screen display area 73 is still tuned to channel 10 and that merely scrolling through the channel area 78 by the subscriber did not affect the tuning of the reduced screen display area 73. A similar result would occur if the "SELECTED IN-FOCUS CHANNEL DETERMINES REDUCED SCREEN" option were instead selected by the system operator. However, the results would change to those shown in FIG. 7 if the user then pressed the SELECT key on the remote 27 (FIG. 2). According to the shown embodiment, the current program is not the same as the "in-focus" program since they are approximately two hours apart. In other embodiments, an additional notice or menu will appear notifying and requesting confirmation that the user wishes to tune the reduced display area 73 to the current program on the selected channel.

Figure 7:
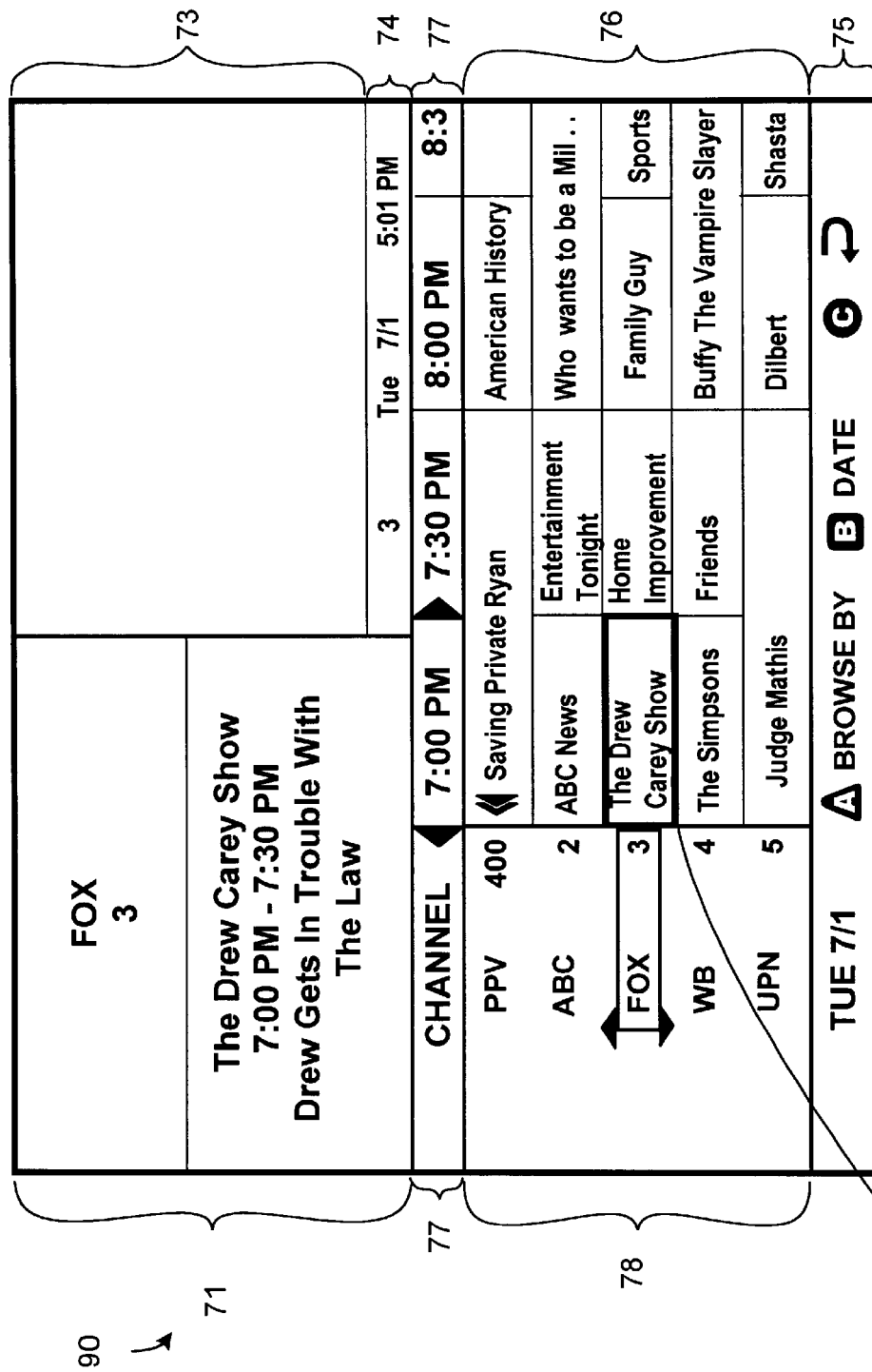
FIG. 7 is an example screen diagram that illustrates the tuning of a reduced screen display area to the channel of the in-focus television program in FIG. 6.

FIG. 7 is also an example of the IPG display 90 that illustrates how the tuning of the reduced screen display area 73 operates while the "IN-FOCUS CHANNEL DETERMINES REDUCED SCREEN" option as illustrated in FIG. 4 is the active selection. Under this scenario, moving between FIG. 5 and FIG. 7 with the use of a down arrow on remote 27 (FIG. 2), the reduced screen display area 73 is tuned to channel 3 as indicated in the information banner 74 after the subscriber scrolls down to channel 3 in the channel area 78. It should be noted that if a subscriber scrolls quickly through the channels in the channel area 78, the reduced screen display portion 73 will not tune to the channel corresponding to the television program in the highlighted area 72 until after the subscriber has stopped scrolling for a predetermined amount of time, e.g., half a second.

Figure 8:
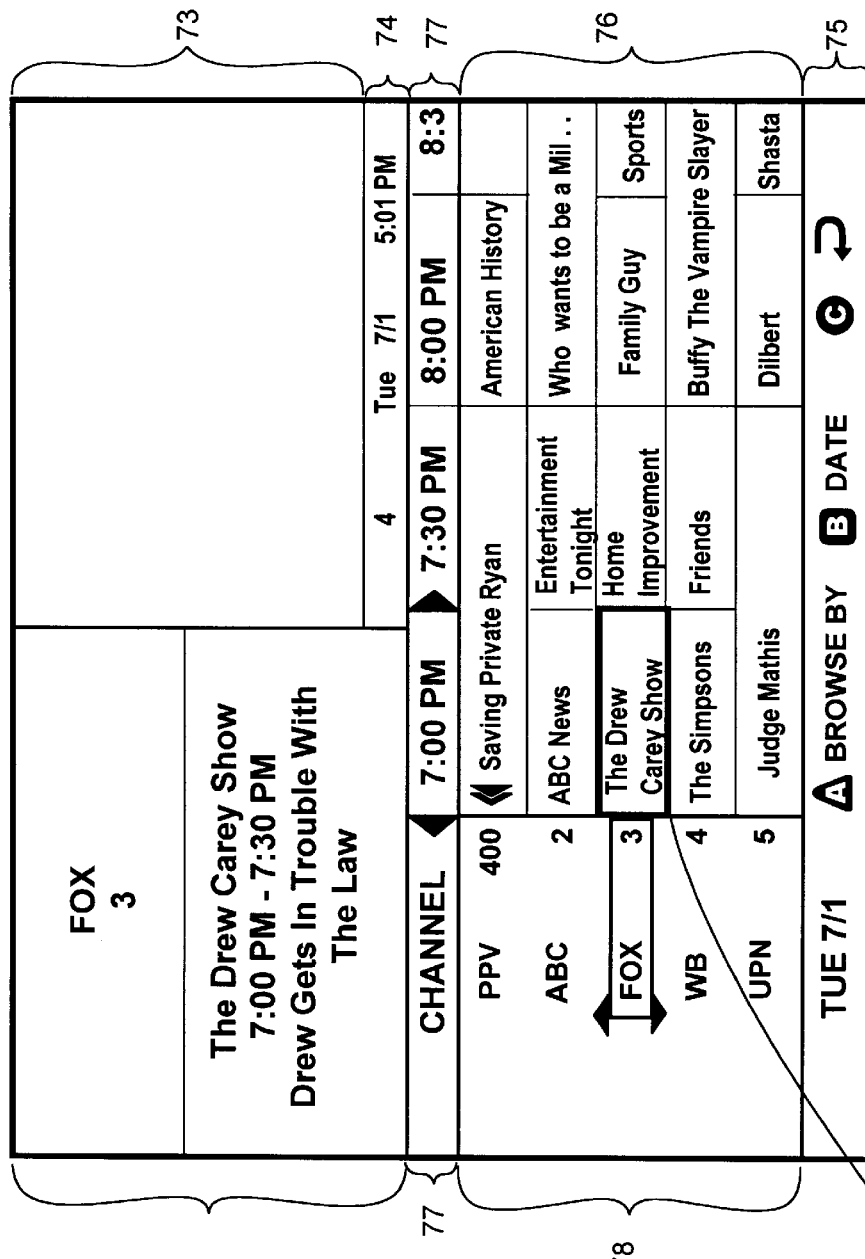
FIG. 8 is an example screen diagram that illustrates the tuning of a reduced screen display area to the next higher numbered channel than the channel of the in-focus program in FIG. 7.

FIG. 8 is an example of the IPG display 100 that illustrates how the tuning of the reduced screen display area 73 operates while the "NON-NUMERIC CHANNEL SIGNALS: TUNE REDUCED SCREEN TO REQUESTED CHANNEL" option in FIG. 4 is active, as transitioned from FIG. 7. Under this example scenario, after a subscriber uses the remote 27 (FIG. 2) to send the non-numeric channel key signal for "channel up," such as a CH+ key on the remote, to the DHCT 16 as depicted in FIG. 2, the reduced screen display area 73 is tuned to channel 4 to display the current program on that channel as indicated in the information banner 74. If a subscriber were to send a "channel down" signal instead of a "channel up" signal, then the reduced screen display area would be tuned to channel 2 instead of channel 4. Likewise, the LAST and FAV keys would cause the last and favorite channels, as tracked by the navigator application 33 in the DHCT 16 (FIG. 2), to be tuned to display the current program on that channel in the reduced screen display area 73. Of course, if the "NON-NUMERIC CHANNEL SIGNALS: EXIT IPG AND TUNE TO REQUESTED CHANNEL" option in FIG. 4 is active, pushing the "channel up" key, for example, on the remote 27 (FIG. 2) would cause the IPG display 90 to disappear, and channel 4 would be tuned in full screen. Other non-numeric channel keys would likewise prompt similar results. However, if the "NON-NUMERIC CHANNEL SIGNALS: CHANGE IN-FOCUS CHANNEL TO REQUESTED CHANNEL" option in FIG. 4 is active, operation of any of the non-numeric channel keys would cause the current program on that requested channel to become the "in-focus" program, which may or may not affect the reduced screen display area 73 depending on the setting of the "IN-FOCUS CHANNEL DETERMINES REDUCED SCREEN" option, as discussed above.

Figure 9:
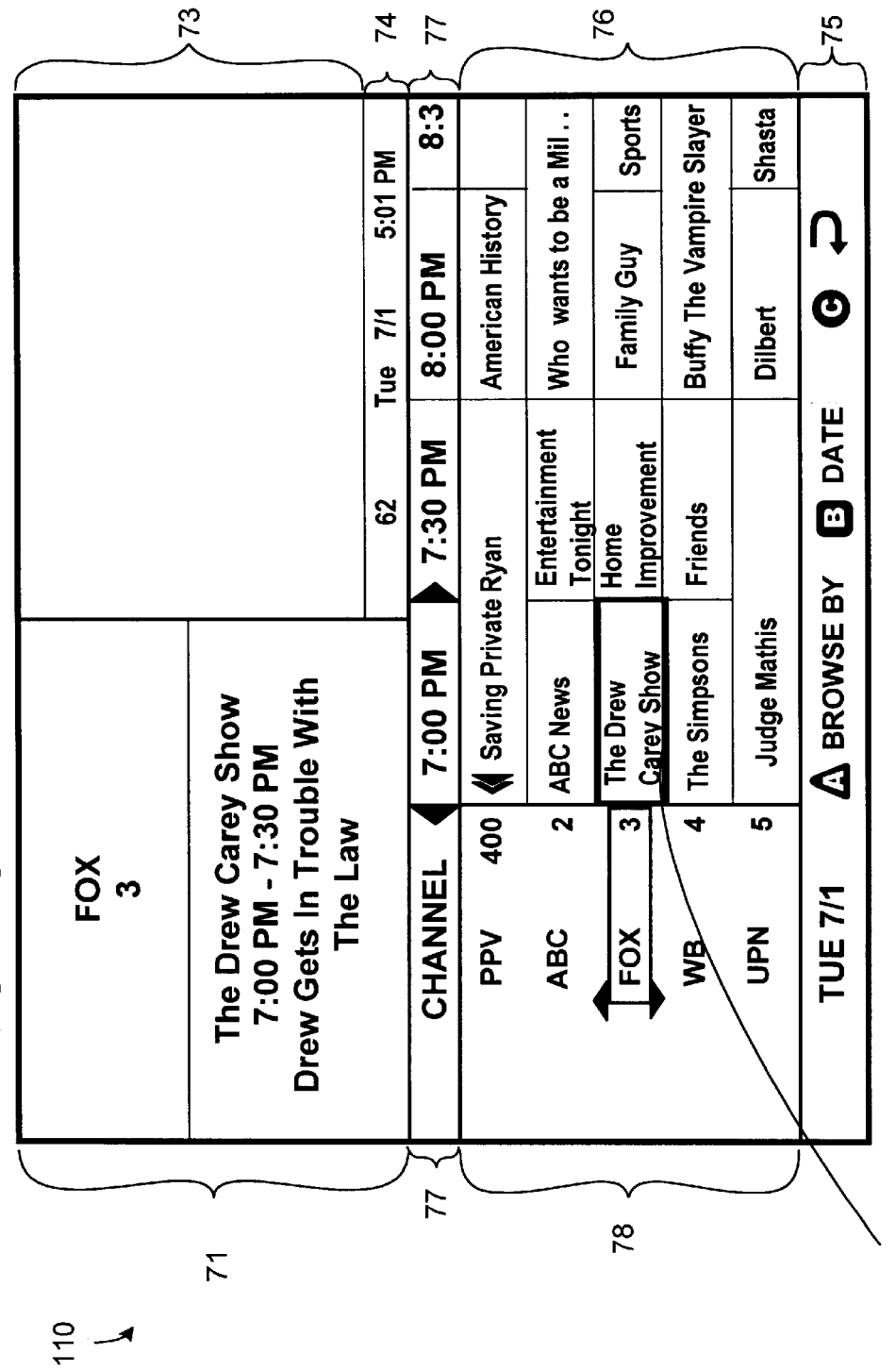
FIG. 9 is an example screen diagram that illustrates the tuning of a reduced screen display area to a channel number specified through user input received by the DHCT as depicted in FIG. 2.

FIG. 9 is an example of the IPG display 110 that illustrates how the tuning of the reduced screen display area 73 operates while the "NUMERIC CHANNEL SIGNALS: TUNE REDUCED SCREEN TO REQUESTED CHANNEL" option in FIG. 4 is active, as transitioned from FIG. 7. Under this scenario, after the subscriber uses the numeric "6" and "2" keys on the remote 27 (FIG. 2) to select channel 62, the reduced screen display area 73 is tuned to channel 62 as indicated in the information banner 74. Likewise, if the "NUMERIC CHANNEL SIGNALS: EXIT IPG AND TUNE TO REQUESTED CHANNEL" option in FIG. 4 is active, entering any channel numbers will cause the IPG display 90 to be removed from the screen, leaving the full screen tuned to the entered channel number. Furthermore, if the "NUMERIC CHANNEL SIGNALS: CHANGE IN-FOCUS CHANNEL TO REQUESTED CHANNEL" option is active, the program currently on that requested channel will become the "in-focus" channel, with the "IN-FOCUS CHANNEL DETERMINES REDUCED SCREEN" option determining whether such change in focus affects the reduced screen area 73.

An alternate embodiment of the invention provides a menu display accessed via the remote to allow the user to swap the position of the reduced screen area 73 and "in-focus" program information area 71 such that 71 is on the right and 73 on the left.

Additionally, an alternate embodiment of the invention includes the navigator application 33 applying the configurations for FIG. 4 "NON-NUMERIC CHANNEL SIGNALS" and "NUMERIC CHANNEL SIGNALS" to other applications that display on a portion of the screen with a reduced screen area showing the DHCT 16 channel as in reduced screen area 73. In a non-limiting example, an email application may be activated via the SAM and the current channel displayed reduced in the upper right ¼ screen. If the "NON-NUMERIC CHANNEL SIGNALS: TUNE REDUCED SCREEN TO REQUESTED CHANNEL" is selected by the system operator, subsequent user remote input for non-numeric channel keys such as CH+, CH–, LAST, FAV will change the channel in the reduced screen as directed via the remote command. Or, if "NON-NUMERIC CHANNEL SIGNALS: EXIT IPG AND TUNE TO REQUESTED CHANNEL" is selected by the system operator, subsequent user remote input for non-numeric channel keys such as CH+, CH–, LAST, FAV will exit the application and change the channel in the reduced screen as directed via the remote command. Similarly, the numeric channel signals configuration is interpreted by the navigator 33 as well.

It should be emphasized that the above-described embodiments of the present invention, particularly, any "preferred embodiments" are merely possible examples of the implementations, merely setting forth for a clear understanding of the principles of the inventions. Many variations and modifications may be made to the above-described embodiments of the invention Without departing substantially from the spirit of the principles of the invention. All such modifications and variations are intended to be included herein within the scope of the disclosure and present invention and protected by the following claims.

We claim:

1. A method for providing video content via a television, comprising the steps of:

providing a user with a menu that includes a plurality of options corresponding to respective control settings for controlling functionality of a channel navigation key, wherein the menu is displayed via the television;

receiving a first user input corresponding to one of the plurality of options that is configured to enable the channel navigation key to navigate video presentations within a video display area;

providing the video display area in conjunction with an interactive program guide ("IPG") that includes a plurality of television program listings, wherein a first video presentation is displayed in the video display area;

receiving a second user input corresponding to the channel navigation key; and providing a second video presentation in the video display area responsive to receiving the second user input and responsive to having previously received the first user input, wherein the second video presentation is different from the first video presentation;

wherein said one of the plurality of options is further configured to disable the channel navigation key from navigating television program listings in the IPG.

2. The method of claim 1, wherein a television program listing that is highlighted in the IPG immediately prior to receiving the second user input remains highlighted in the IPG responsive to receiving the second user input.

3. A television set-top terminal ("STT") configured to output video signals to a television, the STT comprising:

at least one tuner configured to receive video signals corresponding to video presentations;

memory having stored therein program code; and at least one processor that is programmed by the program code to enable the STT to:

provide a user with a menu that includes a plurality of options corresponding to respective control settings for controlling functionality of a channel navigation key, wherein the menu is displayed via the television;

receive a first user input corresponding to one of the plurality of options that is configured to enable the channel navigation key to navigate video presentations within a video display area;

provide the video display area in conjunction with an IPG that includes a plurality of television program listings, wherein a first video presentation is displayed in the video display area;

receive a second user input corresponding to the channel navigation key; and provide a second video presentation in the video display area responsive to receiving the second user input and responsive to having previously received the first user input, wherein the second video presentation is different from the first video presentation;

wherein said one of the plurality of options is further configured to disable the channel navigation key from navigating television program listings in the IPG.

4. The television set-top terminal of claim 3, wherein a television program listing that is highlighted in the IPG immediately prior to receiving the second user input remains highlighted in the IPG responsive to receiving the second user input.

5. A method for providing video content via a television, comprising the steps of:

providing a user with a menu that includes a plurality of options corresponding to respective control settings for controlling functionality of numeral input keys, wherein the menu is displayed via the television;

receiving a first user input corresponding to one of the plurality of options that is configured to enable the numeral input keys to navigate video presentations within a video display area;

providing the video display area in conjunction with an interactive program guide ("IPG") that includes a plurality of television program listings, wherein a first video presentation is displayed in the video display area;

receiving a second user input corresponding to at least one of the numeral input keys; and providing a second video presentation in the video display area responsive to receiving the second user input and responsive to having previously received the first user input, wherein the second video presentation is different from the first video presentation;

wherein said one of the plurality of options is further configured to disable the numeral input keys from navigating television program listings in the IPG.

6. The method of claim 5, wherein a television program listing that is highlighted in the IPG immediately prior to receiving the second user input remains highlighted in the IPG responsive to receiving the second user input.

7. A television set-top terminal ("STT") configured to output video signals to a television, the STT comprising:

at least one tuner configured to receive video signals corresponding to video presentations;

memory having stored therein program code; and at least one processor that is programmed by the program code to enable the STT to:

provide a user with a menu that includes a plurality of options corresponding to respective control settings for controlling functionality of numeral input keys, wherein the menu is displayed via the television;

receive a first user input corresponding to one of the plurality of options that is configured to enable the numeral input keys to navigate video presentations within a video display area;

provide the video display area in conjunction with an interactive program guide ("IPG") that includes a plurality of television program listings, wherein a first video presentation is displayed in the video display area;

receive a second user input corresponding to at least one of the numeral input keys; and provide a second video presentation in the video display area responsive to receiving the second user input and responsive to having previously received the first user input, wherein the second video presentation is different from the first video presentation;

wherein said one of the plurality of options is further configured to disable the numeral input keys from navigating television program listings in the IPG.

8. The television set-top terminal of claim 7, wherein a television program listing that is highlighted in the IPG immediately prior to receiving the second user input remains highlighted in the IPG responsive to receiving the second user input.

* * * * *